Patented May 19, 1936

2,041,513

UNITED STATES PATENT OFFICE 2,041,513

TETRAHALOGENO-ORTHO-AMINOPHENOLS

Max Raeck, Dessau-Haideburg in Anhalt, Germany, assignor to General Aniline Works, Inc., New York, N. Y., a corporation of Delaware No Drawing. Application September 22, 1934, Serial No. 745,101. In Germany November 2, 1933

4 Claims. (Cl. 260—130.5)

The present invention relates to a process of manufacturing tetrahalogeno-ortho-aminophenol.

According to Th. Zincke (Berichte der deutschen Chemischen Gesellschaft 21 (1888), 2724) the chlorination of 2-amino-1-hydroxybenzene hydrochloride in glacial acetic acid produces tetrachloro-2-amino-1-hydroxybenzene. Investigation has shown, however, that the analyzed product is not an individual body but a mixture of the hydrochlorides of several highly chlorinated ortho-aminophenols. Thus Zincke did not in fact have in his hands the tetrachloro-ortho-aminophenol. Later, Bures and Havlinova (Chemisches Zentralblatt 1929, II, 1403) claim to have produced tetrachloro-ortho-aminophenol as a by-product in the saponification of tetrachloroacetyl-ortho-anisidine with caustic soda lye. A technical process for making tetrachloro-2-amino-1-hydroxybenzene has not been founded, however, on this prior literature.

By the present invention 3,4,5,6-tetrahalogen-2-amino-1-hydroxybenzenes are made on a commercial scale in very good yield and purity by converting the easily accessible 3,4,6-trichloro-2-amino-1-hydroxybenzene by treatment with phosgene into the corresponding oxazolone, halogenating this body, for example, chlorinating it or brominating it, so as to obtain the 2-oxo-4,5,6,7-tetrachlorobenzoxazoledihydride-(2,3) of the formula

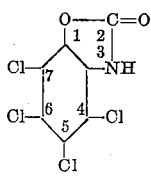

or the 2-oxo-4,5,7-trichloro-6-bromobenzoxazoledihydride-(2,3) and finally saponifying the oxazole ring. There is thus obtained 3,4,5,6-tetrachloro-2-amino-1-hydroxybenzene or 3,4,6-trichloro-5-bromo-2-amino-1-hydroxybenzene. These bodies are useful as intermediate products for the manufacture of dyes and pharmaceutical preparations.

The following examples illustrate the invention, the parts being by weight:—

Example 1.—42.5 parts of 3,4,6-trichloro-2-amino-1-hydroxybenzene are dissolved in a solution of 8 parts of solid sodium hydroxide in 1600 parts of water and into the solution, at 0–5° C., phosgene is passed until there is no more diazotizable matter present. The separated 2-oxo-4,5,7-trichlorobenzoxazoledihydride-(2,3) of the formula

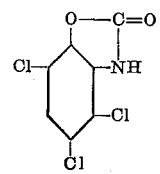

is filtered and washed with water. The paste thus obtained is dissolved hot in a solution of 18 parts of sodium carbonate in 1150 parts of water; then at 20 to 25° C., chlorine is introduced into the solution until the reaction is distinctly acid to Congo. In the course of the chlorination the product is precipitated. When chlorination is complete, the whole is heated for one hour to 80 to 85° C., and then sodium carbonate is strewn in until brilliant paper is powerfully reddened; hereupon 5 parts of crystallized sodium sulfite are added and finally, after stirring for about ¼ hour, the mass is filtered. The filtrate is acidified while hot until there is only a feeble acid reaction to Congo and the separated 2-oxo-4,5,6,7-tetrachlorobenzoxazoledihydride-(2,3) is filtered.

This body is introduced into a solution of 28 parts of solid sodium hydroxide in 750 parts of water and the whole is boiled for 2 hours in a reflux apparatus. The mixture is mixed with hydrochloric acid until the reaction is quite feebly acid to congo, whereupon the precipitated 3,4,5,6-tetrachloro-2-amino-1-hydroxybenzene is filtered, washed and dried. The yield amounts to 44 parts, which is about 90 per cent. of the theoretical, calculated on the trichloro-2-amino-1-hydroxybenzene used.

Example 2.—The 2-oxo-4,5,7-trichlorobenzoxazoledihydride-(2,3), obtained as described in Example 1 from 42.5 parts of 3,4,6-trichloro-2-amino-1-hydroxybenzene, is dissolved in a solution of 18 parts of sodium carbonate in 1150 parts of water. 35 parts of bromine are then allowed to drop into the solution and the whole is heated after 2 hours at 85° C., and the product worked up as described in Example 1. The 2-oxo-4,5,7-trichloro-6-bromobenzoxazoledihydride-(2,3), which melts at 266° C., is saponified as described in Example 1 and there is obtained in this manner a good yield of 3,4,6-trichloro-5-bromo-2-amino-1-hydroxybenzene.

What I claim is:—

1. The process which comprises reacting 3,4,6-trichloro-2-amino-1-hydroxybenzene with phosgene to form the oxazole of the formula

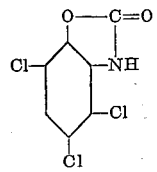

halogenating this compound and saponifying the oxazole ring.

2. The process which comprises reacting 3,4,6-trichloro-2-amino-1-hydroxybenzene with phosgene to form the oxazole of the formula

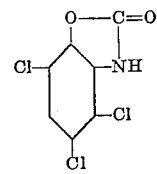

chlorinating this compound and saponifying the oxazole ring.

3. The process which comprises reacting 3,4,6-trichloro-2-amino-1-hydroxybenzene with phosgene to form the oxazole of the formula

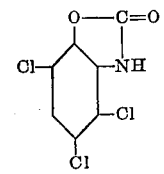

brominating this compound and saponifying the oxazole ring.

4. 3,4,6-trichloro-5-bromo-2-amino-1-hydroxybenzene.

MAX RAECK.